(12) United States Patent
Runde et al.

(10) Patent No.: US 10,795,372 B2
(45) Date of Patent: Oct. 6, 2020

(54) AUTOMATIC END OF ROW TURNING CONTROL SYSTEM FOR A WORK VEHICLE BY LEARNING FROM OPERATOR

(71) Applicant: DEERE & COMPANY, Moline, IL (US)

(72) Inventors: Jeffrey E. Runde, Cedar Falls, IA (US); Qiang R. Liu, Urbandale, IA (US); Shufeng Han, Urbandale, IA (US)

(73) Assignee: DEERE & COMPANY, Moline, IL (US)

( * ) Notice: Subject to any disclaimer, the term of this patent is extended or adjusted under 35 U.S.C. 154(b) by 290 days.

(21) Appl. No.: 15/634,029

(22) Filed: Jun. 27, 2017

(65) Prior Publication Data

US 2018/0373256 A1 Dec. 27, 2018

(51) Int. Cl.
*G05D 1/00* (2006.01)
*G05D 1/02* (2020.01)
*A01B 69/04* (2006.01)

(52) U.S. Cl.
CPC ......... *G05D 1/0221* (2013.01); *A01B 69/008* (2013.01); *G05D 1/0219* (2013.01);
(Continued)

(58) Field of Classification Search
CPC .. G05D 1/0221; G05D 1/0219; G05D 1/0223; G05D 1/0274; G05D 1/0278;
(Continued)

(56) References Cited

U.S. PATENT DOCUMENTS

| 6,990,399 B2 * | 1/2006 | Hrazdera | A01B 69/008 |
| | | | 348/120 |
| 8,131,432 B2 * | 3/2012 | Senneff | A01B 69/007 |
| | | | 701/23 |

(Continued)

FOREIGN PATENT DOCUMENTS

| DE | 10250694 B3 | 2/2004 |
| DE | 102011120886 A1 | 6/2013 |

OTHER PUBLICATIONS

German Search Report, Germnan Application Ser. No. 10 2018 210 379.8, German Patent & Trademark Office, dated Mar. 15, 2019, 12 pages (machine translated) (Year: 2019).*
(Continued)

*Primary Examiner* — James M McPherson
(74) *Attorney, Agent, or Firm* — Taft Stettinius & Hollister LLP; Stephen F. Rost

(57) ABSTRACT

An automatic turning control system for a work vehicle having a ground engaging traction device directed by a manual steering device. The automatic turning control system includes an electronic control unit (ECU), a traction device angle sensor configured to generate an angle signal representative of an angle of the traction device with respect to an axis of the work vehicle, and a vehicle guidance system. The ECU is configured to generate a manual path signal representing an actual path of the work vehicle based on the angle signal. The ECU is operatively connected to a vehicle guidance system and determines a learned path signal based on the manual path signal. The vehicle guidance system automatically directs the work vehicle along the learned path signal when the vehicle moves from a working area, to a non-working area, and back to the working area of a field.

20 Claims, 6 Drawing Sheets

(52) U.S. Cl.
CPC ......... *G05D 1/0223* (2013.01); *G05D 1/0274* (2013.01); *G05D 1/0278* (2013.01); *G05D 2201/0201* (2013.01)

(58) Field of Classification Search
CPC ............ G05D 2201/0201; G01C 21/30; G01C 21/3492; G01C 21/36; G01C 21/3626; G08G 1/0968
USPC .......................................................... 701/25
See application file for complete search history.

(56) References Cited

U.S. PATENT DOCUMENTS

| | | | |
|---|---|---|---|
| 8,209,075 B2* | 6/2012 | Senneff | A01B 69/008 701/23 |
| 9,717,171 B2 | 8/2017 | Redden et al. | |
| 2006/0175541 A1* | 8/2006 | Eglington | G05D 1/0221 250/221 |
| 2006/0178823 A1* | 8/2006 | Eglington | A01B 69/007 701/414 |
| 2013/0231823 A1* | 9/2013 | Wang | A01B 69/008 701/24 |

OTHER PUBLICATIONS

German Search Report, German Application Ser. No. 10 2018 210 379.8, German Patent & Trademark Office, dated Mar. 15, 2019, 12 pages.

\* cited by examiner

AUTOMATIC END OF ROW TURNING CONTROL SYSTEM FOR A WORK VEHICLE BY LEARNING FROM OPERATOR

FIELD OF THE DISCLOSURE

The present invention generally relates to a control system for a work vehicle, and more particularly to a turning control system to automatically control a turn of a tractor.

BACKGROUND

Work vehicles are configured to perform a wide variety of tasks for use as construction vehicles, forestry vehicles, lawn maintenance vehicles, as well as on-road vehicles such as those used to plow snow, spread salt, or vehicles with towing capability. Additionally, work vehicles include agricultural vehicles, such as tractors or self-propelled combine-harvesters, which include a prime mover that generates power to perform work. In the case of a tractor, for instance, the prime mover is often a diesel engine that generates power from a supply of diesel fuel. The diesel engine drives a transmission which moves wheels or treads to propel the tractor across a field at a designated speed. Tractors often include a power takeoff (PTO) which includes a shaft coupled to the transmission and driven by the engine to power an implement being pulled or pushed through a field by the tractor.

Tractors can be steered through a field by a manual command provided by an operator through a manually controlled steering device, such as a steering wheel or joystick, or by an automatic steering command. In the case of an automatic steering command, a steering control signal can be provided by a vehicle guidance system signal, such as provided by a global positioning system (GPS). Steering control systems often include one or more sensors configured to sense a position of the steering device or a position of the wheels with respect to a frame of the vehicle.

The speed of the tractor can also be controlled either manually or automatically as is known by those skilled in the art. Vehicle speed, when manually controlled, is adjusted through the use of an accelerator that is adjusted by a foot pedal or hand device. One type of automatic speed control is also known as "cruise control".

In some tractors, the vehicle direction is also controlled by a vehicle direction control signal provided by the GPS to adjust the vehicle direction. Many agriculture tractors manufactured today include an on-board ability to automatically control the direction of the wheels of the tractor independently of the operator's steering wheel input. This capability paired with a position receiver and a guidance display automatically steers the tractor down a defined straight line path in the field.

Such integrated guidance systems are configured to maintain the tractor and the implement, if included, on a fairly straight line path, without curving or deviating, by adjusting the direction of the steered wheels of the tractor only. These systems, however, struggle with maintaining direction along a defined path when the path's curvature deviates from a straight line path to a curved path, such as one taken when the tractor makes a turn to transition from one field row to another field row.

Some tractors include an on-board guidance control system that enables the operator of the tractor to define tracks, which follow a crop row, for a vehicle guidance system which the guidance system follows by automatically steering the tractor. When the tractor arrives at the end of a given track at the end of a row, or at the edge of the field, the operator returns to a manual steering mode in which the operator takes back steering control from the automated system, and steers the tractor from the end of one track to the beginning of a next desired track. Once the tractor is close to this new track, the operator engages the automatic steering system again to move the tractor along the row.

In other on-board guidance systems, automated turning from the end of one track to the beginning of the next track is provided which allows the operator to leave the automatic steering system engaged through the turn. Such systems control the shape of the turn by adjusting settings within the system, such as a working width, a track spacing width, and tractor and implement dimensions. Generally such systems, while being adequate for standard tractor and implement operations, do not handle specialized or atypical turn requirements, which are necessitated by the use of unique implements or production methods.

What is needed therefore is a turning control system that is configured to determine a turning path for a vehicle.

SUMMARY

An automatic vehicle turning method and apparatus for a work vehicle are disclosed to control vehicle or vehicle and implement turning based on a steering guidance command provided by a guidance control system, such as a GPS system.

The present disclosure utilizes a software based process or algorithm using programmed instructions and a user interface accessible to the work vehicle operator. A vehicle's turning direction is managed in parallel with a vehicle guidance system configured to move the work vehicle along predetermined path located in a field. While a tractor is depicted, the present disclosure is not limited to tractors, but is applicable for use with different types of powered work vehicles including, but not limited, to a combine harvester, a sprayer, a cotton harvester or cotton picker.

The present disclosure provides an operator, who is presented with unique turn requirements, an ability to teach a turning control system a desired custom turn shape, which would override a default turn shape built into the system. For ease of use, the system would record useful manually driven turns in the background, without requiring prompting by the operator. Once the operator determines that a custom turn is needed, the system would automatically select the best learned turn shape for each new turn situation.

In one embodiment of the disclosure, there is provided an automatic turning control system for a work vehicle having a ground engaging traction device directed by a manual steering device. The control system includes a traction device angle sensor configured to generate an angle signal representative of an angle of the traction device with respect to an axis of the work vehicle and an electronic control unit (ECU) operatively connected to the traction device angle sensor. The ECU is configured to generate a manual path signal representing an actual path of the work vehicle, wherein the manual path signal is identified at least in part by an angle signal. The ECU further generates a learned path signal based on the manual path signal. A vehicle guidance system is operatively connected to the ECU and is configured to automatically direct the work vehicle along the learned path signal.

In another embodiment, there is provided an automatic turning control system for a work vehicle having a ground engaging traction device directed by a manual steering device. The turning control system includes a traction device angle sensor generating an angle signal which represents an angle of the traction device with respect to an axis of the work vehicle and a vehicle guidance system generating a vehicle position signal. A user interface device is configured to receive one or more input values provided by an operator. Control circuitry is operatively connected to the traction device angle sensor, the vehicle guidance system, and the user interface device, wherein the control circuitry includes a processer and a memory. The memory is configured to store program instructions and the processor is configured to execute the stored program instructions to: i) generate a manual path signal based on the vehicle position signal, wherein the vehicle position signal results from steering control of the ground engaging device responsive to the manual steering device; and ii) generate a learned path signal based on the manual path signal.

In still another embodiment, there is provided a method of automatically turning a work vehicle having a ground engaging traction device directed by a manual steering device wherein the work vehicle moves through a field having a working area and a non-working area. The method includes: i) identifying a plurality of manual paths based on a plurality paths taken through the non-working area, wherein each of the plurality of manual paths is determined by the manual steering device; ii) designating at least one of the manual paths as a learned path in a memory; and iii) automatically controlling movement of the work vehicle based on the learned path as the work vehicle moves through the non-working area.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

Figure 1:
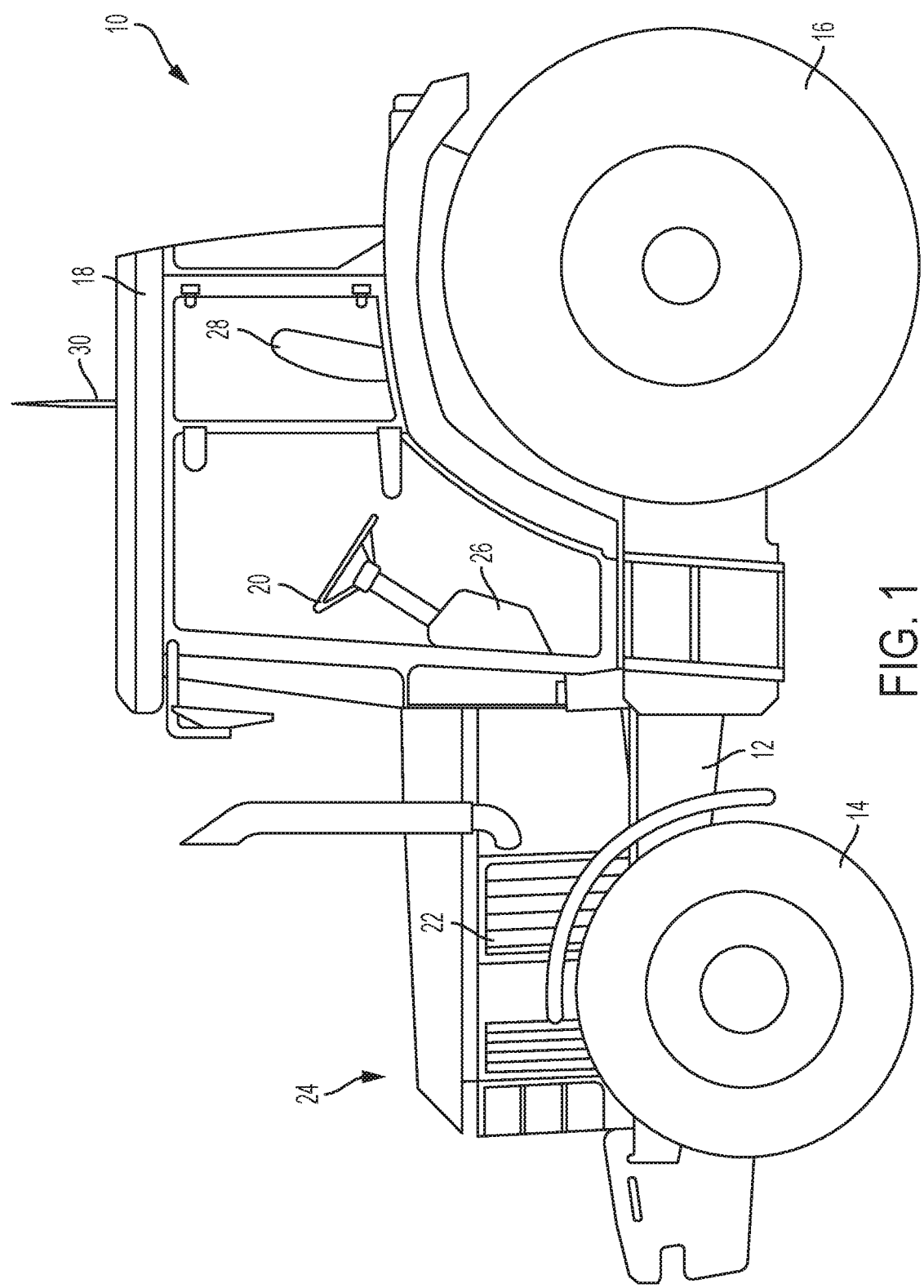
FIG. 1 is a side elevational view of a work vehicle, and more specifically, of an agricultural vehicle such as a tractor.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

FIG. 1 is an elevational side view of an agricultural vehicle, and more particularly a tractor 10, including a frame 12 supported on a pair of front wheels 14 and a set of rear wheels 16. While wheels are described in the embodiments, other ground engaging traction devices, including treads, are contemplated. An operator cab 18 is mounted on the frame 12 and contains various controls for the vehicle 10 so as to be within the reach of a seated or standing operator. In one aspect, these controls may include a steering wheel 20. A prime mover 22, such as an engine, is mounted on the frame 12 beneath a housing 24 and supplies power for driven components of the tractor 10. The engine 22, for example, is configured to drive a transmission (not shown), which is coupled to drive the front wheels 14 at various selected speeds and either in forward or reverse modes. In other embodiments, the rear set of wheels is driven to move the tractor, or all of the wheels are driven in an all-wheel drive mode to move the tractor 10.

While the described embodiments are discussed with reference to a tractor, in addition to addition to agricultural vehicles, other work vehicles are contemplated including construction vehicles, forestry vehicles, lawn maintenance vehicles, as well as on-road vehicles such as those used to plow snow, spread salt, or vehicles with towing capability.

The cab 18 defines an operator workstation 26, which is supported by the frame 12. The cab 18 also encloses a seat 28 for seating the operator. The operator workstation 26, in different embodiments, includes one or more of an operator user interface, a steering wheel, a joystick, an accelerator pedal, and a power take-off (PTO) control device for turning on or off the PTO. Pedals for a brake and a clutch are also located in the cabin 18, but are not shown.

The user interface includes a plurality of operator selectable buttons configured to enable the operator to control the operations and functions of the tractor 10. The user interface, in one embodiment, includes a user interface screen having a plurality of user selectable buttons to select from a plurality of commands or menus, each of which are selectable through a touch screen having a display. In another embodiment, the user interface includes a plurality of mechanical push buttons as well as a touch screen. In another embodiment, the user interface includes a display screen and only mechanical push buttons. A communication antenna 30 is supported by the cab 18 and provides for the transmission and reception of signals transmitted through the air. In one embodiment, the communication antenna 30 is a GPS antenna configured to receive and to send global positioning data to and from a GPS satellite as is known by those skilled in the art.

Figure 2:
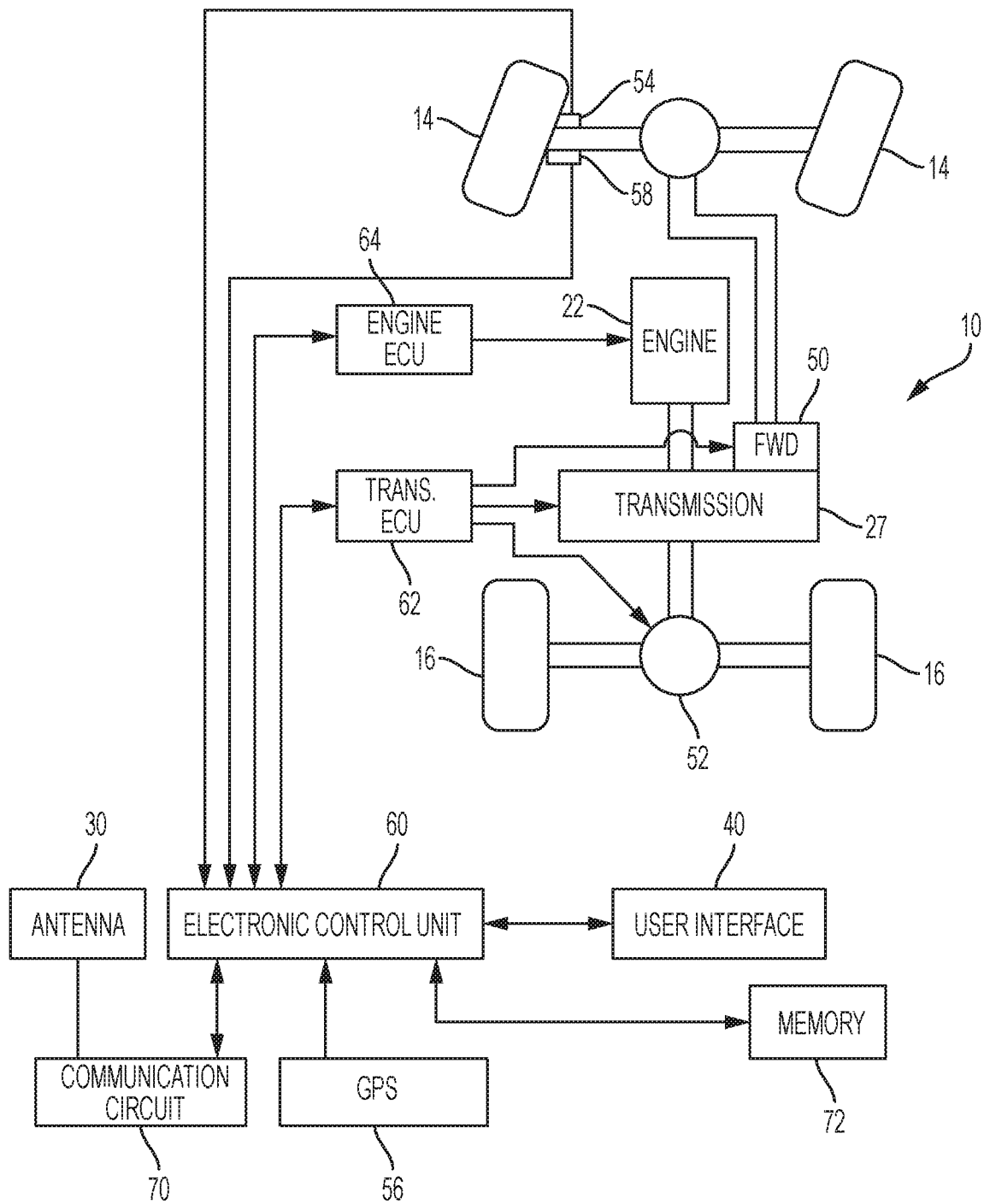
FIG. 2 is a simplified schematic diagram of an electro-hydraulic control system for a work vehicle having steerable wheels.

FIG. 2 is a simplified schematic diagram of the vehicle 10 and a control system embodying the invention. A transmission 27 includes an electronically controlled front wheel drive control unit 50 and an electronically controlled differential lock control unit 52. The front wheel drive control unit 50 is coupled to the steerable front wheels 14. When the front wheel drive control unit 50 is on, torque is transmitted from the transmission 27 to the front wheels 14. When the front wheel drive control unit 50 is off, torque is not transmitted from the transmission to the front wheels 14.

The differential lock control unit 52 is coupled to the driven rear wheels 16. When the differential lock control unit 52 is unlocked (off, open differential), it allows each of the rear wheels 16 to rotate at different speeds, such as when negotiating a turn. By contrast, when the differential lock control unit 52 is on or locked, it forces both left and right wheels on the same axle to rotate at the same speed under nearly all circumstances.

A wheel angle sensor 54 senses the angular position of the wheels 14. A guidance computer 56, which in different embodiments includes different types of guidance computers including GPS unit, provides a vehicle position signal. A wheel speed sensor 58 provides a wheel speed signal. While different embodiments implement different types of guidance computers, the present disclosure describes the automatic ground speed control system with respect to a GPS system. The present disclosure is not, however, limited to a GPS system and other guidance systems are contemplated.

A main electronic control unit (ECU) 60 is connected to the wheel angle sensor 54, the GPS unit 56, and the wheel speed sensor 58. The ECU 60 communicates with a transmission ECU 62 and with an engine ECU 64.

Transmission ECU 62 controls the transmission 27 and provides control signals to the front wheel drive control unit 50 and to the differential lock control unit 52. The engine ECU 64 controls the engine 18. The user interface 40 is connected to the main ECU 60. The GPS unit 56 is a conventional GPS unit. In one embodiment, the GPS unit 56 is configured to locate the position of the tractor 10 within a field.

A communication circuit 70 is coupled to the ECU 60 and to the antenna 30. The communication circuit 70 is configured to transmit signals generated by the ECU 60, which in some applications have been generated in response to information submitted by an operator through the user interface 40, located in the cab 18. The communication circuit 70 is further configured to receive signals from the antenna 30. A memory 72 is operatively coupled to the ECU 60 and is configured to store information. In some embodiments, the communication circuit 70 is used for internal communication among devices or circuits located in the vehicle.

The ECU 60, in different embodiments, includes a computer, computer system, control circuitry, or a programmable device, e.g., multi-user or single-user computers. In other embodiments, the ECU 60 includes one or more processors (e.g. microprocessors), and the associated internal memory including random access memory (RAM) devices comprising the memory storage of the ECU 60, as well as any supplemental levels of memory, e.g., cache memories, non-volatile or backup memories (e.g. programmable or flash memories), read-only memories, etc. In addition, the memory can include a memory storage physically located elsewhere from the processing devices and can include any cache memory in a processing device, as well as any storage capacity used as a virtual memory, e.g., as stored on a mass storage device or another computer coupled to ECU 60 view the communication circuit 70. The mass storage device can include a cache or other dataspace which can include databases. In addition to internal memory or in place of internal memory, a memory 72 is operatively coupled to the ECU 60 and is configured to store information. Each of the transmission ECU 62 and engine ECU 64, in different embodiments, includes the above described components and features.

The automatic vehicle turn control system automatically and continually generates an optimized vehicle turn command based on a vehicle's current turning path when being provided by an operator. More specifically, the vehicle operates according to an automatic vehicle control responsive to operator inputs to the ECU 60, which is programmed to process program instructions stored in the memory 72 or other accessible memory. In one embodiment, the programmed instructions provide not only a closed loop vehicle guidance of the tractor, but also provide a closed loop vehicle turning control at the same time. In other embodiments, the described closed loop vehicle turning control system works in concert with preexisting closed loop vehicle guidance systems. By providing vehicle turning control, the operator is relieved from having to continuously manage the vehicle's turning path to stay on a desired path. In one embodiment, the programmed instructions maintain a direction of the vehicle during a turning path based on one or more operator's manually controlled turns.

Figure 3:
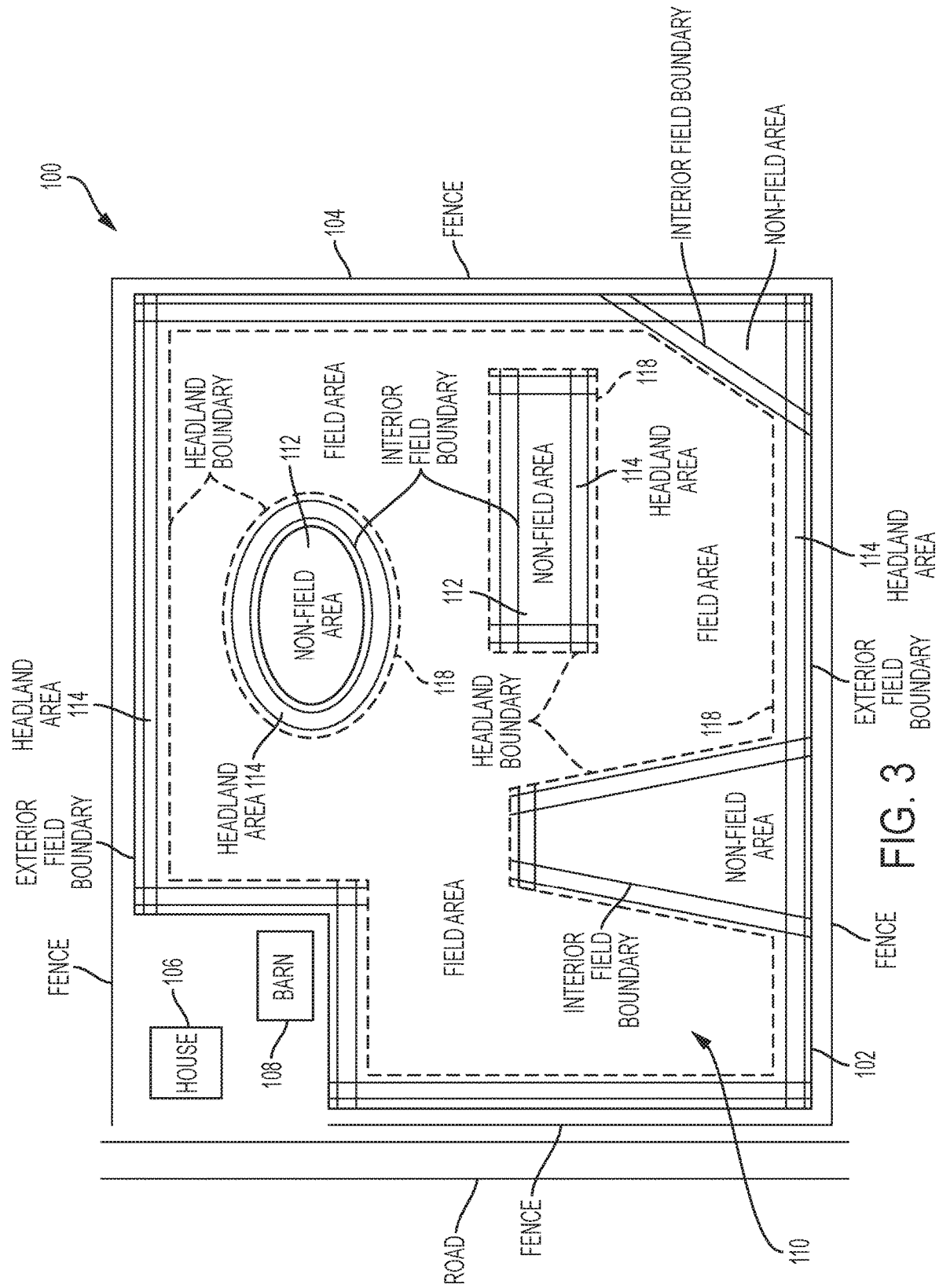
FIG. 3 is one example of a farm field defined by an operator for use with an automatic ground speed control system for a vehicle.

FIG. 3 is one example of a farm field 100 which illustrates a variety of paths and obstacles that a tractor working the field 100 encounters during a typical planting or cultivation. The field 100 includes an exterior field boundary 102 which is enclosed by a fence 104. A house 106 and barn 108 are located outside the fence 104. Within the fence 104, a field area 110 of the farm field 100 is available for planting while certain non-field areas 112 are not planted due to natural or man-made barriers, such as rocky areas or farm buildings. A headland area 114 is located between the exterior field boundary 102 and a headland boundary 118. The headland area 114 is not planted and provides for turning of the vehicle when necessary to begin another row (track) after finishing a row. Headland areas 114 are also located around the non-field areas 112.

Because of the irregular nature of the field area, the tractor must navigate the field area 110 at different speeds. For instance, a tractor taking a straight line path across the field area must eventually turn to move to the next adjacent row. In some areas of the field, the ground speed is established for a straight line path that is relatively free of impediments which could necessitate a slowing of the tractor. In other areas of the field, however, shorter distances of travel, for instance between the headland area 102 and one of the non-field areas 112, are traveled by the tractor at a reduced speed since the distance between headland boundaries 118 is relatively close.

The farm field 100 is mapped by an operator and includes the boundaries and areas which are stored in the memory as a map. The ECU 60 in combination with the GPS system 56 determines the tracks taken by the work vehicle.

The present disclosure provides an operator, who is presented with unique turn requirements, an ability to teach a turning control system a desired custom turn shape, which would override a default turn shape built into the system. For ease of use, the system would record useful manually driven turns in the background, without requiring prompting by the operator. Once the operator determines that a custom turn is needed, the system would automatically select the best learned turn shape for each new turn situation.

The present disclosure provides an automated turn system that enables the operator to teach the control system a preferred turn and to use customized turn shapes. The control system operates the work vehicle in response to a software program which determines and stores one or more vehicle turns in response to an operator's input, including data and steering direction. The software algorithm runs in the background when the operator is manually driving the vehicle through a field. The operator's driven path is monitored to determine whether the driven path includes a useful turn. When a useful turn is detected, a learned turn, based on the useful turn, is saved for use when the control system automatically steers the vehicle and needs to generate a turn path that matches the parameters or characteristics of the learned turn.

The automatic vehicle turning control system is configured to control a vehicle turn by automatically monitoring a manual turn provided by the operator. The monitored manual turn is analyzed by the turning control system to determine whether the monitored turn path is a useful turn path sufficiently effective for being used repeatedly to thereby relieve the operator of making a manual turn.

A software control algorithm stored in memory includes programming instructions configured to automatically and continuously detect operator driven end of row turns with the vehicle. When the control system detects a useful turn, that turn is saved as a template for use at a future end of row turn with the same or similar characteristics.

The control system continuously monitors occurrences of when the operator is manually driving the vehicle to determine whether the manual turn is a useful turns that normally occurs at the end of a row or edge of the field. The vehicle then saves the useful turns in memory and the vehicles operates according to the saved turns in one or more embodiments. These customized learned turns replace the system's default turn templates and are used as automated turns by the vehicle's on-board end of row turn control system.

In different embodiments, when a new turn is needed, the control system searches the saved turns to find a best match to the current turn scenario. If the search is successful, the system uses the saved turn. If the search is not successful in one embodiment, the control system reverts back to an auto-generated turn. In an alternative, the operator turns the work vehicle manually, the control system learns the turn, and save the turn for later use.

As described with respect to FIG. 3, the field layout is known and the intended tracks of the vehicle and implement are known along the straight line paths being taken through the field area. Because the tracks are defined by the operator and known by the vehicle control system, the locations of turns at the end of one row and the start of another row are also known.

Figure 4:
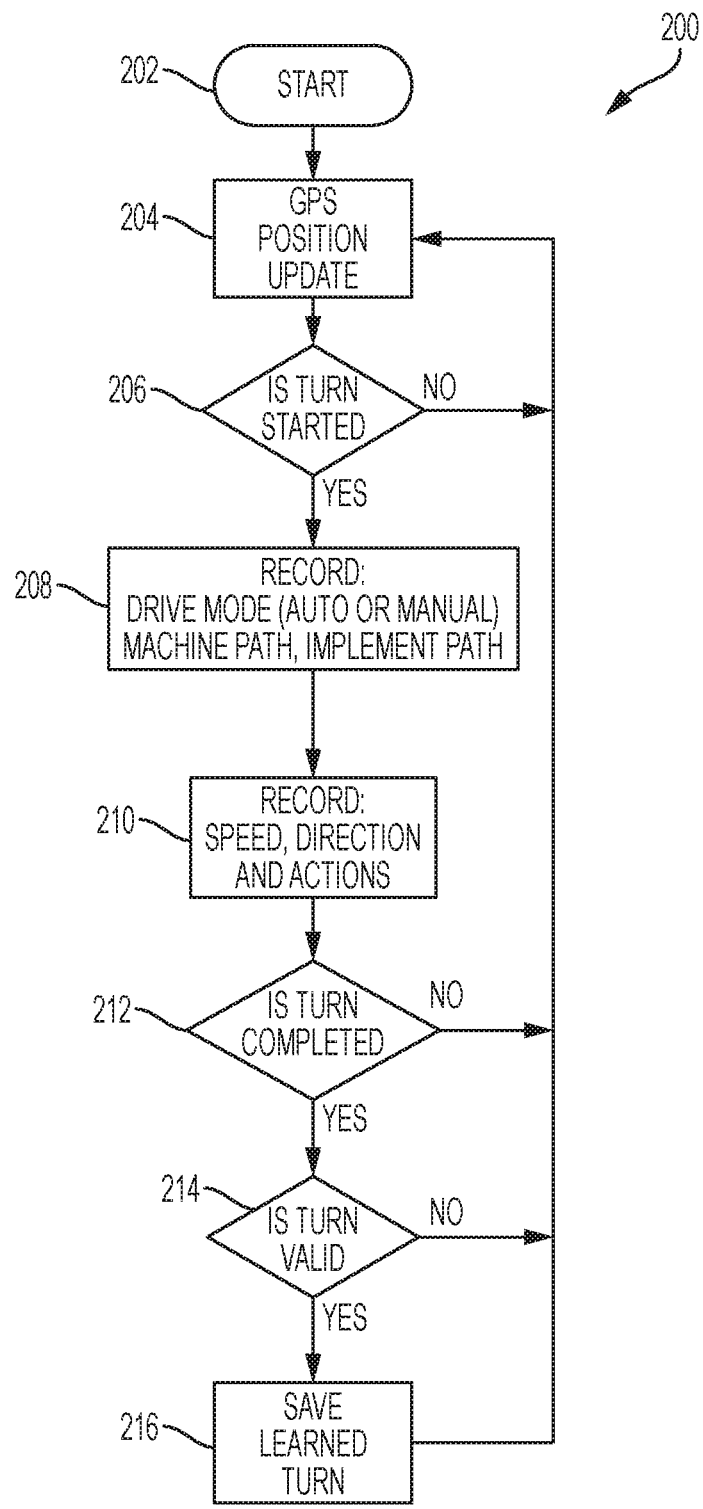
FIG. 4 is one embodiment of a process block diagram of a process performed by the control system of FIG. 2 to determine a vehicle turn.

In one embodiment, the vehicle control system operates according to the process block diagram 200 of FIG. 4 beginning at the start block 202. The process diagram 200 operates in the background of the control system control operation and does not require user intervention. In another embodiment, the operator turns on or off the background control process, such that if turned off, the background process does not determine turn paths. In a different embodiment, the background control process runs continually in the background, wherein an operator control is not provided. Once the process begins, the vehicle position is determined at block 204 by updating the vehicle position within a track using a guidance system or GPS update. This vehicle position is updated continuously, in one embodiment, such that the vehicle position is known at the point a turn is started. The control system monitors the state of the wheel angle sensor 54 to determine whether a turn is started at block 206. If a turn has not started, the process returns to block 204, where the vehicle position is updated. If, however, the turn has started, the process stores data representative of the drive mode, either automatic or manual, a vehicle path, and an implement path at block 208.

In another embodiment, the turn start and turn end point is not detected by monitoring the angle sensor, Instead, it is calculated at the intersection point of a current straight track and the headland boundary. The recorded start is made at a predefined distance before a turn start point and after turn end point. These transition lengths are necessary to control system to transient between straight track and turn. In one embodiment, the start turn point and the turn end point are approximately equal to three times of the system length from vehicle to implement.

If different embodiments, one or both of the vehicle path and the implement path are known based on the size, which includes one or both of a length and width, of each of the work vehicle and implement. In some embodiments, the distance between the end of the vehicle and the start of the implement are known, since this linkage of the vehicle to the implement determines at least in part the path taken by the operator. By determining the location of each of the vehicle and the implement, the turn paths are identified based on both vehicle and implement characteristics. Such an identification provides repeatable turn paths for different combinations of vehicles and implements. A used herein, the term "vehicle" is used to describe a vehicle without a separate implement, such as a self-propelled combine harvester, or a vehicle pulling or pushing an implement.

After recording the drive mode, the vehicle (machine) path, and the implement path, the speed and the direction of the vehicle, which are identified by the GPS system 56, are stored as a record at block 210. In this and other embodiments, the different types of actions are also recorded. For instance, the raising and lowering of an implement are recorded and is used in other turn paths. In one embodiment, a gear direction, forward or reverse, is determined by the vehicle when a turn is started. In another embodiment, a path direction is used. Such values are stored on a continuous basis until the control system determines whether the turn is complete at block 212. If the turn is not complete, the control system process returns to block 204, where a position update is determined and stored as part of the recorded values of blocks 208 and 210. If it is determined that the turn is complete at block 212, the process determines at block 214 whether the turn is a valid learned turn.

Figure 5:
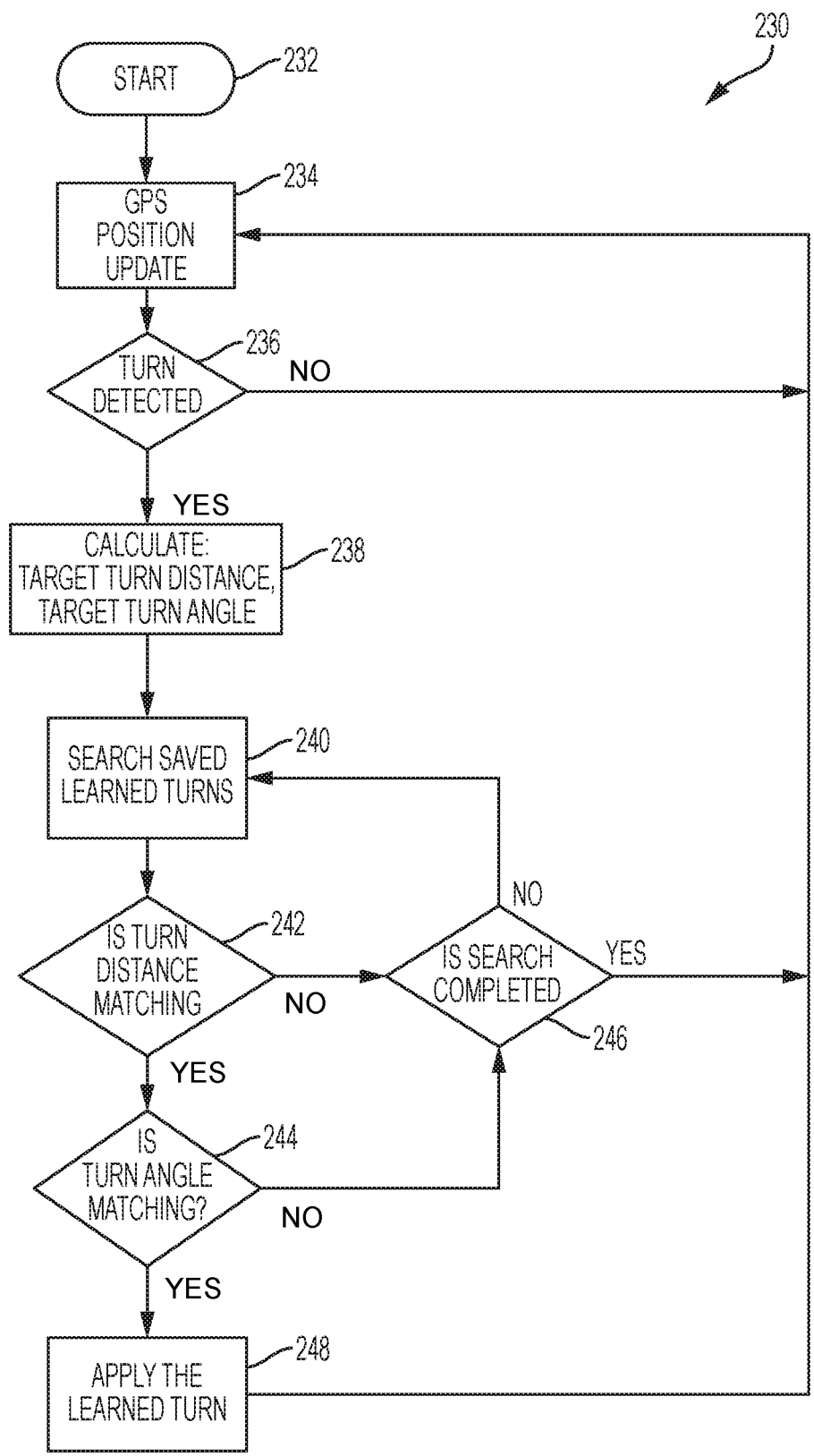
FIG. 5 is another embodiment of a process block diagram of a process performed by the control system of FIG. 2 to determine a vehicle turn.

To determine whether the controlled turn is a valid learned turn, the control system determines: i) whether at least part of the turn is driven manually between the turn start and end points; ii) whether the lateral distance of the path to the target turn start or end points is less than one-third the track spacing; and iii) whether the heading change at the turn start and the turn end points is approximately one-hundred and eighty degrees. If the turn is not a valid turn, the current learned turn is abandoned and the control system continues to monitor for a next occurrence of turns by returning to block 204, where vehicle position is updated. If, however, the turn is determined to be valid, the valid learned turn is stored in memory at block 216. Since the machine process of FIG. 4 runs in the background, one or more learned turns are stored in the memory 72 for later use by the turn control system which selects a suitable turn from one of the stored turns as illustrated in the process block diagram 230 of FIG. 5. The process starts at block 232 after the turn control system has stored a sufficient number of turns in memory. The sufficient number of turns, in different embodiments, is one or more and depends on the types of turns being stored. Once the process begins, a position of the vehicle is updated at block 234. If a turn is not detected at block 236, the position of the vehicle continues to be updated at block 234. If, however, a turn is detected at block 236, the ECU 60 calculates a target turn distance and a target turn angle at block 238 which are calculated based on the current position, the turn distance to a target and the target turn angle, which is determined based on the signal provided by the wheel angle sensor 54. The calculated target turn distance and the target turn angle are stored as a turn record in memory.

Turn detection is based on the straight track and headland boundary. The operator of control system determine which track to turn to next and to whether to turn left or right. The operator or control system further determines in different embodiments whether to move to the next adjacent track or to skip one or more tracks. The turn distance is the distance between the tracks where the turn starts to the next track where the turn ends.

Once the target turn distance and target turn angle are determined, these values are compared to the saved learned turns. The turn angle is the angle between the straight track and the headland. A search is started at block 240, where each of the saved learned turns are compared to the determined values of the target turn distance and target turn angle for each of the stored turn records. In one embodiment, the ECU 60 includes a comparator. If the target turn distance is equal to one of the turn distances of the saved turn at block 242, then the target turn angle is compared to the saved turn angle at block 244. If the turn distance or the turn angle doesn't match any of the saved learned turns, then the search returns block 240, where searching of the records continues. Once a match is found, the search is completed at block 246, and the process block diagram returns to block 234. At the same time, since both the turn distance and the turn angle have been matched to one of the save learned turns, the matching saved learned turn is applied to the vehicle at block 248 and used by the ECU 60 to turn the vehicle.

Figure 6:
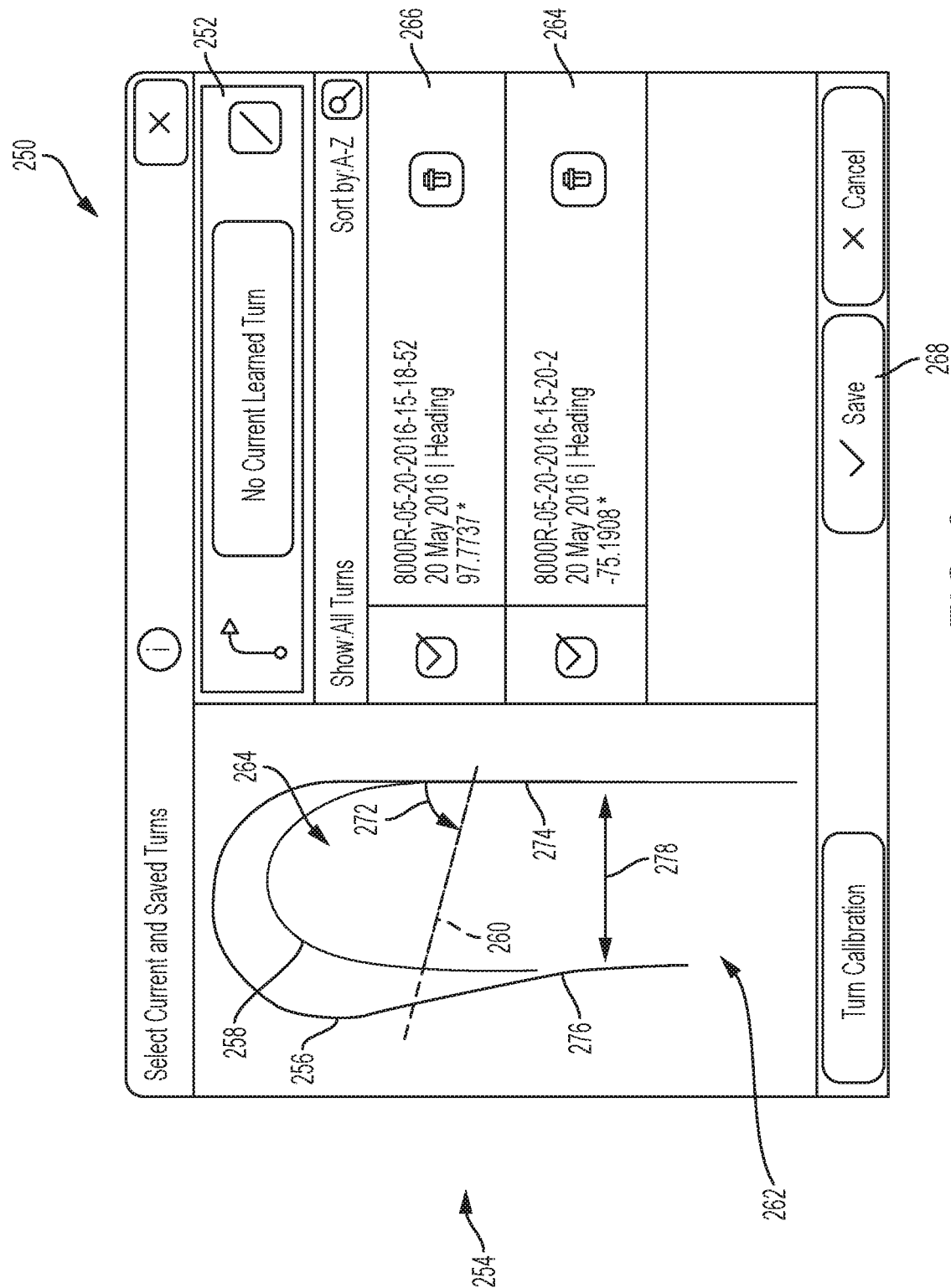
FIG. 6 is one embodiment of a user interface of an operator workstation.

FIG. 6 illustrates one embodiment of a user interface 250 of the operator workstation 26 which provides the operator with a mechanism to select a one or more saved turns for later use by the turn control system. As described with respect to block 216 of FIG. 4, a learned turn is saved if it is determined to be valid. In another embodiment, a learned turn is reviewable by the operator at the user interface 250 which is provided to enable selection of a current and a saved turn for used in an automatic turning mode. The user interface 250 displays in display portion 252 whether a current learned turn is available for use. In this embodiment, there is not a current learned turn. As the tractor moves from one track to the next track, a display portion 254 displays a current path 256 of the work vehicle, a current path 258 of the implement, and a border 260 which divides a field area 262 and headland area 264. In this embodiment, the work vehicle includes the vehicle tracking device such that the path 256 indicates the actual path of the work vehicle. Display portion 254 is a turn preview window and displays a learned turn which the user selects by highlighting 252, 264, or 266. The implement of the this embodiment does not include vehicle tracking and consequently the path 258 of the implement is derived from the path of tracked work vehicle, one or both of a length and width of the implement, and the location of the location of the work vehicle hitch with respect to the implement. The path of the work vehicle and the implement diverge after the work vehicle enters the headland area, but converge as the work vehicle returns to the field area.

Because the boundary 260 is not generally perpendicular to the tracks defining rows in this example, the path taken by the work vehicle is one which can be determined and saved for later use. In this embodiment, all turns are being displayed with the turn shown in display portion being shown by selection of the highlighted display portion 264. The user display 250 provides for toggling between the current path, shown in the display portion 254, and a previously saved path which would be displayed if a display portion 266 is selected by the operator. If the operator determines that the path of display portion 264 is preferred, the operator selects a save button 268 to check or uncheck one or more of the displayed paths to be included in the next search. The trash icon in display portions 264 and 266 are used to delete the turn from the memory. If the operator prefers the path selected by the display portion 266, the operator would select that path for later use. Once a turn is selected for later use, the process diagram of FIG. 5 uses this path as well as other saved paths during the matching operation described there. In addition, the user interface 250 provides a turn calibration button 270 which enables a turn analyzer algorithm to calculate the minimum turn radius and other turn characteristics to be used for future automatically generating turns.

As described herein, in one embodiment the turn control system includes three features that facilitate automatic turning of the vehicle. The first feature is a learning component which includes: i) continuously recording manually driven vehicle and implement path in the background; ii) looking for valid manual turns; iii) saving the learned useful turn shape and other parameters such as minimum turn radius, path traveled speeds and directions, vehicle and implement; iv) learning different types of turns including those having forward and reverse segments as found in three point turns; and v) maintaining a large number of learned turns for different situations.

A second feature is an operational component including: a machine process or algorithm that automatically matches a learned turn to a current turn by comparison of different parameters including turn angle, turn distance and others. Another feature includes optionally providing a way for the operator to view, activate, and delete any learned turns. The turn angle is defined as the angle 272 between a track 274 and the boundary 260. The turn distance is defined as a distance 278 between the track 274 and a track 276. The point at which the vehicle crosses the boundary 260 which in the track 274 is a turn start point. The point at which the vehicle crosses the boundary 260 on the path to the track 276 is the turn end point.

A third feature is a tuning component which provides a machine capability to use parameters of a learned turn to tune the default turn generator with minimum turn radius, maximum implement angle, turn type, and other features. The tuning component is illustrated as the calibration button 270 of FIG. 6.

While exemplary embodiments incorporating the principles of the present disclosure have been described hereinabove, the present disclosure is not limited to the described embodiments. Instead, this application is intended to cover any variations, uses, or adaptations of the disclosure using its general principles. In addition, where the terms greater than and less are used in making comparisons, it is understood that either of the less than or greater than comparisons can include being equal to as well. Further, this application is intended to cover such departures from the present disclosure as come within known or customary practice in the art to which this disclosure pertains and which fall within the limits of the appended claims.

The invention claimed is:

1. An automatic turning control system for a work vehicle having a ground engaging traction device directed by a manual steering device, the control system comprising:
   a traction device angle sensor configured to generate an angle signal representative of an angle of the traction device with respect to an axis of the work vehicle,
   a control system including a default end of row turn template and an electronic control unit (ECU) operatively connected to the traction device angle sensor, wherein the ECU is configured to generate a manual end of row turn, the manual end of row turn including data and steering direction, the manual end of row turn generated in response to a manual command provided by an operator through a manually controlled steering device and representing a manually driven end of row turn of the work vehicle based on the operator's manual command including the angle signal and which is configured to generate a learned end of row turn based on the manually driven end of row turn, wherein the ECU is configured to: i) generate a plurality of learned end of row turns; ii) store in a memory each one of the plurality of learned end of row turns as a valid learned end of row turn template if the learned turn is determined to be a valid learned end of row turn; iii) abandoning learned end of row turns that are not valid learned end of row turns; and iv) replacing the default end of row turn template with one of the valid learned end of row turn templates; and a vehicle guidance system operatively connected to the ECU and configured to automatically direct the work vehicle along one or more of the plurality of valid learned end of row turns, using the learned end of row turn template.

2. The control system of claim 1 wherein the one or more of the plurality of valid learned end of row turns includes a direction of travel component and a speed of travel component.

3. The control system of claim 1 wherein each of the one or more of the plurality of valid learned end of row turns includes one of: a manually driven portion; a heading change of approximately one-hundred and eighty degrees; and a distance between a start and end point of less than one-third a track spacing.

4. The control system of claim 3 wherein the one or more of the plurality of learned end of row turns includes a heading change between the start and end of the turn of approximately one-hundred eighty degrees.

5. The control system of claim 3 wherein each of the one or more of the plurality of learned end of row turns includes an action component, the action component identifying an action taken by an implement during generation of the manual end of row turn.

6. The control system of claim 3 wherein the vehicle guidance system includes a map of a field including a work area and a non-working area divided by a boundary, wherein the ECU determines a turn angle component of the manual end of row turn when the work vehicle is at or near the boundary.

7. The control system of claim 6 further comprising a user interface device having a display and one or more user inputs, wherein the display is configured to display the manual end of row turn, and the one or more inputs enables a user to store the displayed manual end of row turn as one or more of the plurality of the learned end of row turns in memory.

8. The control system of claim 7 wherein the one or more inputs of the user interface device includes a toggle device adapted to toggle between each of the plurality of learned end of row turns and to select at least one of the plurality of learned end of row turns as a preferred learned end of row turn.

9. The control system of claim 7 wherein the ECU includes a comparator configured to compare the turn angle component of each of the learned end of row turns to the angle signal generated by the traction device angle sensor.

10. The control system of claim 8 wherein the ECU selects one of the learned end of row turns based on an output of the comparator and directs the ground engaging traction device along the selected learned end of row turn.

11. An automatic turning control system for a work vehicle having a ground engaging traction device directed by a manual steering device, the control system comprising:
a traction device angle sensor generating an angle signal which represents an angle of the traction device with respect to an axis of the work vehicle;
a vehicle guidance system generating a vehicle position signal;
a user interface device configured to receive one or more input values provided by an operator; and
control circuitry operatively connected to the traction device angle sensor, the vehicle guidance system, and the user interface device, wherein the control circuitry includes a processer and a memory, wherein the memory stores a default end of row turn template and program instructions that in response to execution by the processor causes the control circuitry to:
determine a manual end of row turn based on the vehicle position signal, wherein the vehicle position signal results from manual steering control of the ground engaging device responsive to the manual steering device responding to a manual command provided by an operator; and
determine a learned end of row turn based on the manual end of row turn;
identify the learned end of row turn as a valid learned end of row turn;
storing the valid learned end of row turn in the memory as a valid learned end of row turn template; and
replacing the default end of row turn template with the valid learned end of row turn template to be used by the automatic turning control system in place of the default end of row turn template.

12. The control system of claim 11 wherein the processor further causes the control circuitry to:
identify a turn angle of the work vehicle, wherein the turn angle includes a portion thereof being manually controlled by the operator, wherein the manual end of row turn includes the turn angle.

13. The control system of claim 12 wherein the processor further causes the control circuitry to:
determine a plurality of manual end of row turns; and
receive an input from the user interface device, wherein the input designates one of the plurality of manual end of row turns as the valid learned end of row turn.

14. The control system of claim 13 wherein the processor further causes the control circuitry to:
identify the learned end of row turn as a valid learned end of row turn based on one of: a manually driven portion; a heading change of approximately one-hundred and eighty degrees; and a distance between a start and end point of less than one-third a track spacing.

15. The control system of claim 14 wherein the processor further causes the control circuitry to:
identify each of the learned end of row turns with a direction of travel component and a speed of travel component.

16. The control system of claim 15 wherein the processor further causes the control circuitry to:
identify an action taken by an implement while determining the manual end of row turn; and
identify at least one of a learned end of row turn signals with the identified action.

17. The control system of claim 14 wherein the processor further causes the control circuitry to:
identify a current end of row turn angle of a manually controlled manual end of row turn;

select one of the plurality of valid learned end of row turns based on the identified current turn end of row angle; and turn the work vehicle automatically based using the selected one of the plurality of valid learned end of row turns.

18. A method of automatically turning a work vehicle having a ground engaging traction device directed by a manual steering device, the work vehicle moving through a field having a working area and a non-working area, the method comprising:

providing a default end of row turn template;

identifying a plurality of manual end of row turns based on a plurality of end of row turns taken through the non-working area, wherein each of the plurality of manual end of row turns is determined at least in part by the manual steering device responding to a manual command provided by an operator;

designating at least one of the plurality of manual end of row turns as a valid learned end of row turn having a valid learned end of row turn template in a memory; and automatically controlling movement of the work vehicle based on the valid learned end of row turn template by using the valid learned end of row turn template in place of the default end of row turn template as the work vehicle moves through the non-working area.

19. The method of claim 18 further comprising:

designating each of the identified plurality of manual end of row turns in a memory as one of a plurality of valid learned end of row turns based on one of: a manually driven portion; a heading change of approximately one-hundred and eighty degrees; and a distance between a start and end point of less than one-third a track spacing, wherein each of the valid learned end of row turns is identified with a valid learned end of row turn template;

selecting one of the plurality of valid learned end of row turn templates based on a current turn angle of the work vehicle when transitioning from the working area to the non-working area to replace the default end of row turn template; and automatically controlling movement of the work vehicle with the selected one of the valid learned end of row turn templates as the work vehicle moves through the non-working area.

20. The method of claim 19 further comprising:

identifying each of the plurality of valid learned end of row turns with a direction of travel component and a speed of travel component; and automatically controlling movement of the work vehicle with the selected one of the valid learned end of row turns based on the direction of travel component and the speed of travel component.

\* \* \* \* \*